(12) United States Patent
Warner et al.

(10) Patent No.: US 12,415,627 B2
(45) Date of Patent: Sep. 16, 2025

(54) EXPANDABLE BACKDRIVE RESISTANT WEDGE FOR LIMITED ACCESS APPLICATIONS

(71) Applicant: Georgia Tech Research Corporation, Atlanta, GA (US)

(72) Inventors: Raymond Warner, Atlanta, GA (US); Michael Jeffries, Atlanta, GA (US); Christopher Keel, Atlanta, GA (US); Joshua Hurt, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 272 days.

(21) Appl. No.: 18/231,944

(22) Filed: Aug. 9, 2023

(65) Prior Publication Data

US 2024/0051684 A1 Feb. 15, 2024

Related U.S. Application Data

(60) Provisional application No. 63/371,264, filed on Aug. 12, 2022.

(51) Int. Cl.
| | |
|---|---|
| *B64G 1/64* | (2006.01) |
| *F16B 2/10* | (2006.01) |
| *F16B 2/14* | (2006.01) |

(52) U.S. Cl.
CPC .............. *B64G 1/641* (2013.01); *F16B 2/14* (2013.01); *F16B 2/10* (2013.01)

(58) Field of Classification Search
CPC .......... B64G 1/64; B64G 1/641; B64G 1/642; B64G 1/6425; B64G 1/643; B64G 1/644; B64G 1/646; B64G 1/6462; B64G 1/6464; B64G 1/648; F16B 2/00; F16B 2/04; F16B 2/06; F16B 2/065; F16B 2/10; F16B 2/12; F16B 2/14; F16B 2/18; F16B 2/185
USPC ......................................................... 403/286
See application file for complete search history.

(56) References Cited

U.S. PATENT DOCUMENTS

| | | | | |
|---|---|---|---|---|
| 4,998,842 A | * | 3/1991 | Sheridan ............... | E04B 1/1906 403/252 |
| 5,186,567 A | * | 2/1993 | Evenson ................ | B64G 1/641 403/171 |
| 5,439,310 A | * | 8/1995 | Evenson .............. | B64G 1/6455 403/321 |

* cited by examiner

*Primary Examiner* — Joshua E Rodden
(74) *Attorney, Agent, or Firm* — TROUTMAN PEPPER LOCKE LLP; Ryan A. Schneider; Korbin M. Blunck

(57) ABSTRACT

A device for securing a load including a sled, a snubber, and a wedge. The sled can be configured to be coupled to the load. The snubber can be coupled to the sled and configured to be inserted into a chamber. The snubber can include a slot. The snubber can be configured to move between a contracted position and one or more expanded positions. The wedge can be configured to be inserted into the slot in a distal direction to cause the snubber to transition from the contracted position to the one or more expanded positions. The snubber can form an interference fit with an internal wall of the chamber when in a first expanded position of the one or more expanded positions to fix the location of the load relative to the chamber.

20 Claims, 5 Drawing Sheets

EXPANDABLE BACKDRIVE RESISTANT WEDGE FOR LIMITED ACCESS APPLICATIONS

CROSS-REFERENCE TO RELATED APPLICATIONS

This application claims the benefit of U.S. Provisional Application Ser. No. 63/371,264 filed on 12 Aug. 2023, which is incorporated herein by reference in its entirety as if fully set forth below.

GOVERNMENT LICENSE RIGHTS

This invention was made with government support under Agreement No. HQ085421D0002 awarded by the Missile Defense Agency. The government has certain rights in the invention.

FIELD OF THE DISCLOSURE

The various embodiments of the present disclosure relate generally to securing a payload, and more particularly to devices, methods, and systems of delivering and/or securing payloads.

BACKGROUND

The installation of small satellites is sometimes performed by sliding a canister (i.e., "payload") into a blind slot and bolting a front flange of the payload to the exposed surrounding launch vehicle structure. As a result, the payload is most often cantilevered from the front flange which creates an undesirable load path. Embodiments of the expandable back-drive resistant wedge device disclosed herein seek to remedy this problem, in particular, by providing one or more of the following solutions for the installation of small satellite payloads into blind slots: creation of a better load path (fixed-fixed vs fixed-free); remote activation (from the flange); and vibration resistance to losing load (by creating preload).

BRIEF SUMMARY

An exemplary embodiment of the present disclosure provides a device for securing a load, the device comprising a sled, a snubber, and a wedge. The sled can be configured to be coupled to the load. The snubber can be coupled to the sled and configured to be inserted into a chamber. The snubber can comprise a slot. The snubber can be configured to move between a contracted position and one or more expanded positions. The wedge can be configured to be inserted into the slot in a distal direction to cause the snubber to transition from the contracted position to the one or more expanded positions. The snubber can form an interference fit with an internal wall of the chamber when in a first expanded position of the one or more expanded positions to fix the location of the load relative to the chamber and transfer load through a more desirable path.

In any of the embodiments disclosed herein, the wedge can comprise a proximal end configured to be inserted into the slot and a distal end comprising a first plurality of teeth.

In any of the embodiments disclosed herein, the device can further comprise a pawl comprising a second plurality of teeth configured to engage the first plurality of teeth to prevent movement of the wedge in a proximal direction.

In any of the embodiments disclosed herein, the pawl can comprise a first arm comprising the second plurality of teeth and an opposing second arm comprising a third plurality of teeth. The third plurality of teeth can be configured to engage a fourth plurality of teeth positioned on a distal end of the wedge.

In any of the embodiments disclosed herein, the device can further comprise a cam configured to actuate to cause the second plurality of teeth to disengage from the first plurality of teeth, thereby allowing movement of the wedge in the proximal direction.

In any of the embodiments disclosed herein, the proximal end of the wedge can comprise an aperture, and the device can further comprise a bolt configured to be inserted into the aperture, wherein actuation of the bolt can cause the wedge to move in a distal direction.

In any of the embodiments disclosed herein, the snubber can comprise a first arm and a second arm, and the slot can be positioned between the first and second arms.

In any of the embodiments disclosed herein, a distance between the first arm and the second arm can be greater when the snubber is in the contracted position than in the one or more expanded positions.

In any of the embodiments disclosed herein, the snubber can comprise a hinge coupling the first arm to a distal end of the snubber, and the hinge can be configured to allow the snubber to transition from the contracted position to the one or more expanded positions.

In any of the embodiments disclosed herein, the snubber can comprise plastic.

In any of the embodiments disclosed herein, the snubber can comprise a single integrated piece of plastic.

Another embodiment of the present disclosure provides a device for securing a load using a chamber. The device can comprise a snubber and a wedge. The snubber can have a distal end configured to be inserted into the chamber and a proximal end comprising a slot. The snubber can be configured to transition between a contracted state allowing movement within the chamber and an expanded state in which the snubber forms an interference fit within the chamber. The wedge can have a distal end configured to be inserted into the slot of the snubber to cause the snubber to transition from the contracted position to the expanded position. The device can be configured to attach to the load, such that the load is secured when the snubber is in the expanded state in the chamber.

In any of the embodiments disclosed herein, the device can further comprise a sled configured to removably attach to the load, and the snubber and wedge can be coupled to the sled.

In any of the embodiments disclosed herein, the wedge can have a proximal end comprising a first plurality of teeth, the device can further comprise a pawl having a second plurality of teeth, and cooperative engagement of the first and second pluralities of teeth can prevent the wedge from moving in the proximal direction.

In any of the embodiments disclosed herein, the device can further comprise a cam configured to actuate to cause the pawl to move away from the wedge disengaging the first plurality of teeth from the second plurality of teeth.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Figure 1:
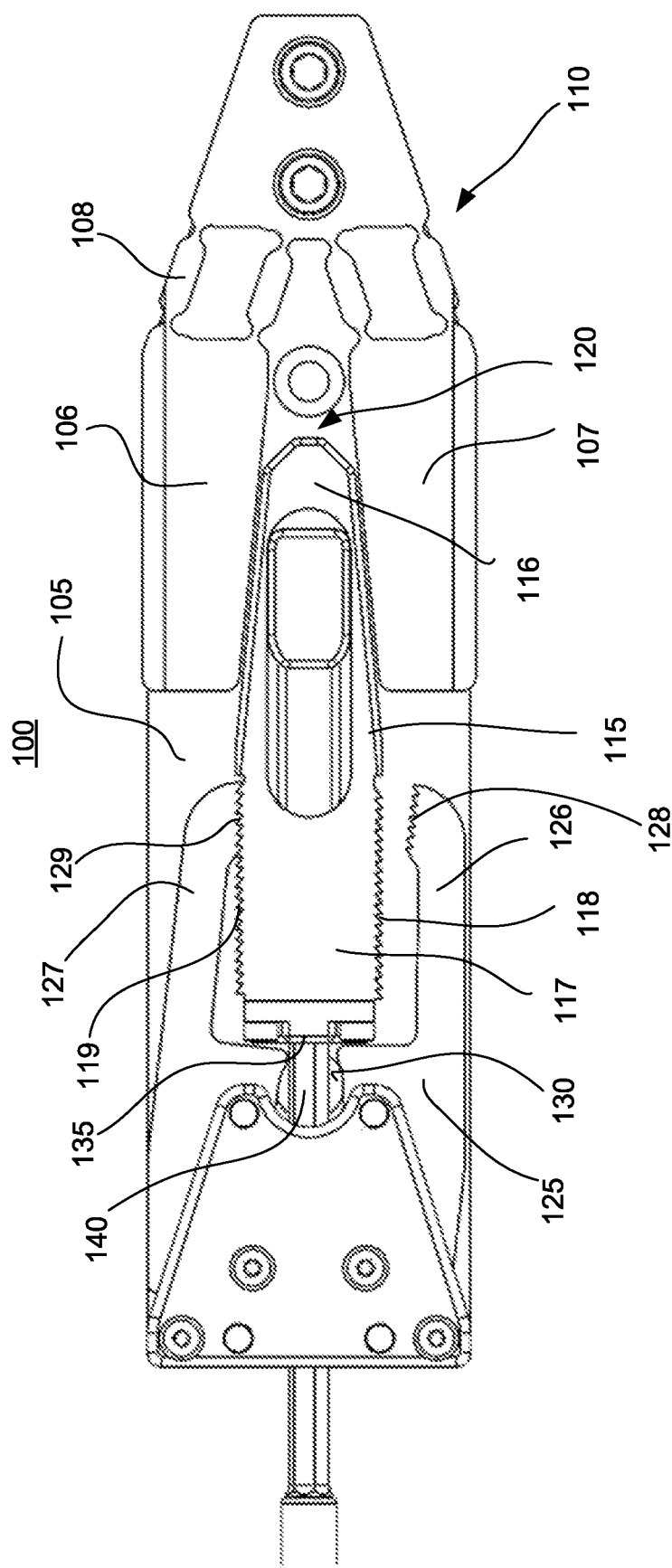
FIG. 1 provides a top view of a device for securing a load, in accordance with some embodiments of the present disclosure.

As shown in FIG. 1, an exemplary embodiment of the present disclosure provides a device 100 for securing a load. The device 100 can comprise a sled 105, a snubber 110, and a wedge 115. The sled 105 can serve as the body/frame for the device 100, such that other components, e.g., the snubber 110 and wedge 115, can be coupled to the sled. The sled 105 can be configured to be removably coupled to the load. If a particular load is to be coupled to a chamber, the load can attached to the sled of the device. The device can then be inserted into and engage the chamber to couple the load, as discussed below.

The snubber 110 can be configured to be inserted into a chamber (not shown in FIG. 1). The snubber can comprise a slot 120, and the wedge can be inserted into the slot, causing the snubber to transition from a contracted position to an expanded position. In the contracted position, the snubber can freely move into and out of the chamber. In the expanded position, the snubber can be secured in the chamber through an interference fit with the chamber.

In some embodiments, the snubber can be configured to transition from the contracted position through a number of expanded positions based on the distance the wedge is inserted into the slot. For example, as the wedge is inserted into the slot in a distal direction, the outer surface of the wedge engages the inner surface of the slot to cause portions of the snubber 110 to expand outward. As the wedge continues to move in the distal direction further, the portions of the snubber can continue to expand outward. As the snubber expands, it can engage the inner surface of the chamber to fix the location of the load relative to the chamber.

Figure 2:
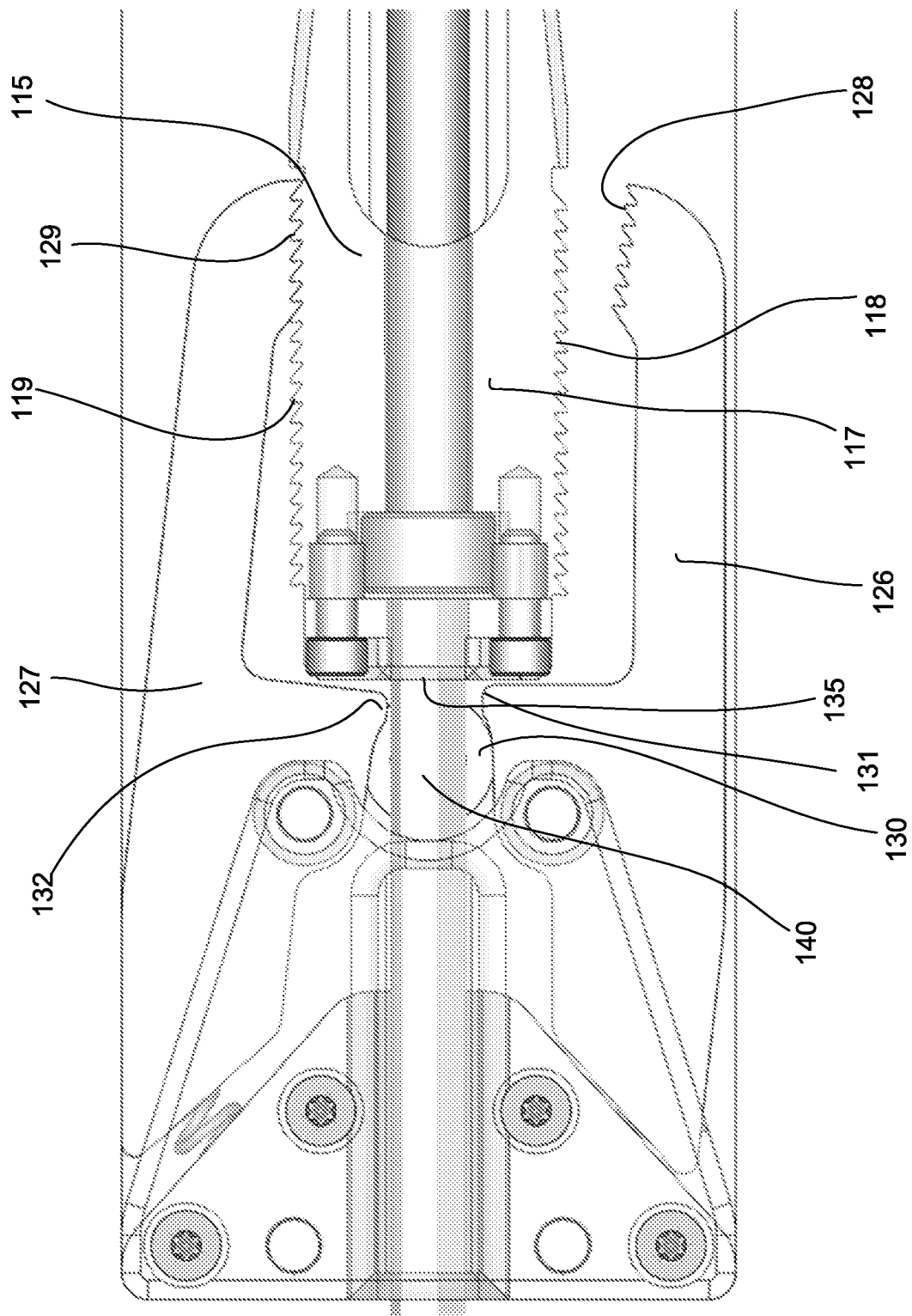
FIG. 2 provides a top view of a portion of a device for securing a load, in accordance with some embodiments of the present disclosure.
Figure 3:
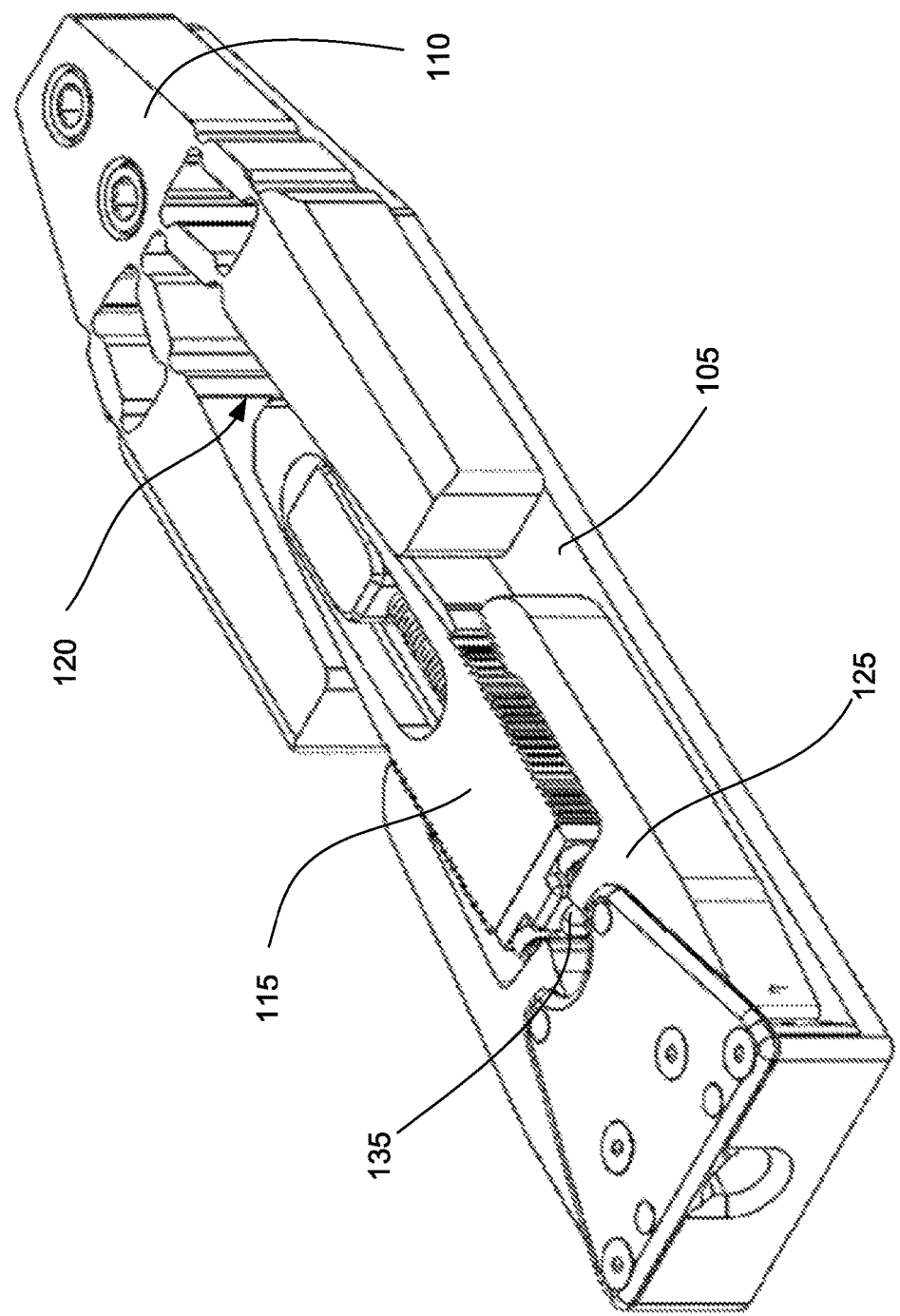
FIG. 3 provides a perspective view of a device for securing a load, in accordance with some embodiments of the present disclosure.
Figure 4:
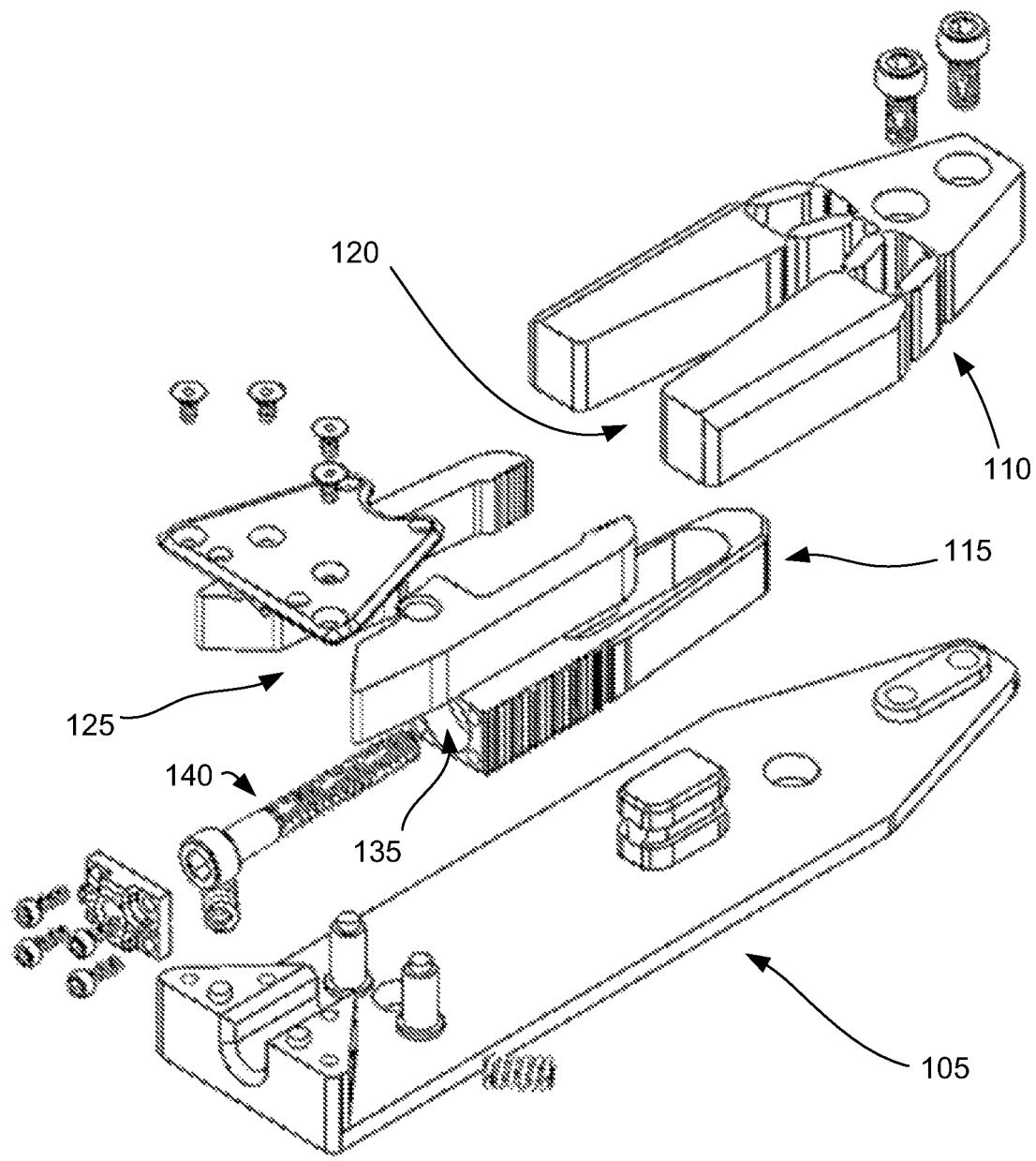
FIG. 4 provides an exploded view of a device for securing a load, in accordance with some embodiments of the present disclosure.

The wedge 115 can comprise a distal end 116 configured to be inserted into the slot 120 and a proximal end 117 comprising a first plurality of teeth 118. The device 100 can further comprise a pawl 125. FIG. 2 provides a view of a portion of an exemplary device focusing on a pawl of the device. The pawl 125 can be configured to prevent the wedge 115 from unintentionally moving in the proximal direction and out of the slot 120. The pawl can comprise a second plurality of teeth 128 that can engage with the first plurality of teeth 118 of the wedge 115 to prevent the wedge from moving back in the proximal direction and out of the slot 120.

In some embodiments, the pawl can comprise a first arm 126 comprising the second plurality of teeth 128. In some embodiments, the pawl can further comprise a second arm 127 comprising a third plurality of teeth 129. The third plurality of teeth 129 can be configured to engage a fourth plurality of teeth 119 positioned on a proximal end 117 of the wedge 115. The first 126 and second 127 arms can pivot from an inward position, in which teeth 128 129 of the pawl 125 are engaged with teeth 118 119 of the wedge 115 (see second arm 127 in FIG. 1), to an outward position, in which teeth 128 129 of the pawl 125 are not engaged with teeth 118 119 of the wedge 115 (see first arm 126 in FIG. 1).

In some embodiments, the device can further comprise a cam 130 configured to actuate to cause the teeth of the pawl 128 129 to disengage from the teeth of the wedge 118 119, thereby allowing movement of the wedge 120 in the proximal direction and out of the slot 120. For example, actuation of the cam 130 can engage cam lobes 131 and 132 of the first arm 126 and second arm 127 of the pawl 125, respectively, which can cause the first 126 and second 127 arms to pivot outward such that the teeth of the pawl 128 129 disengage from the teeth of the wedge 118 119.

In any of the embodiments disclosed herein, the proximal end 117 of the wedge 120 can comprise an aperture 135. A bolt 140 can be inserted into the aperture 135, and actuation of the bolt 140 can cause the wedge to move in a distal direction and into the slot.

In any of the embodiments disclosed herein, the snubber can comprise a first arm 106 and an opposing second arm 107. As shown in FIG. 1, the slot 120 can be positioned between the first 106 and second 107 arms. Thus, a distance between the first arm 106 and the second arm 107 can be greater when the snubber 110 is in any one of the expanded positions than when in the contracted position. As the wedge 115 moves in the distal direction and further into the slot 120, the snubber 110 can continue to expand through a number of expanded positions.

In any of the embodiments disclosed herein, the snubber 110 can comprise a hinge 108 coupling the first arm 106 to a distal end of the snubber, and the hinge 108 can be configured to allow the snubber 110 to transition from the contracted position to an expanded position. For example, as the wedge 115 moves in the distal direction into the slot 120, the outer surface of the wedge contacts the inner surface of the slot 120. The force on the inner surface of the slot, e.g., the first arm 106 of the snubber 110, can cause the first arm 106 to pivot outward from the hinge 108 and engage the inner surface of the chamber. The second arm 107 of the snubber 110 can also be coupled to the distal end of the snubber 110 via another hinge.

The snubber can be made of many different materials known in the art. In some embodiments, the snubber can be made of plastic, rubber, or the like. In some embodiments, the snubber can be made of a single integrated piece of material, e.g., plastic.

Figure 5A:
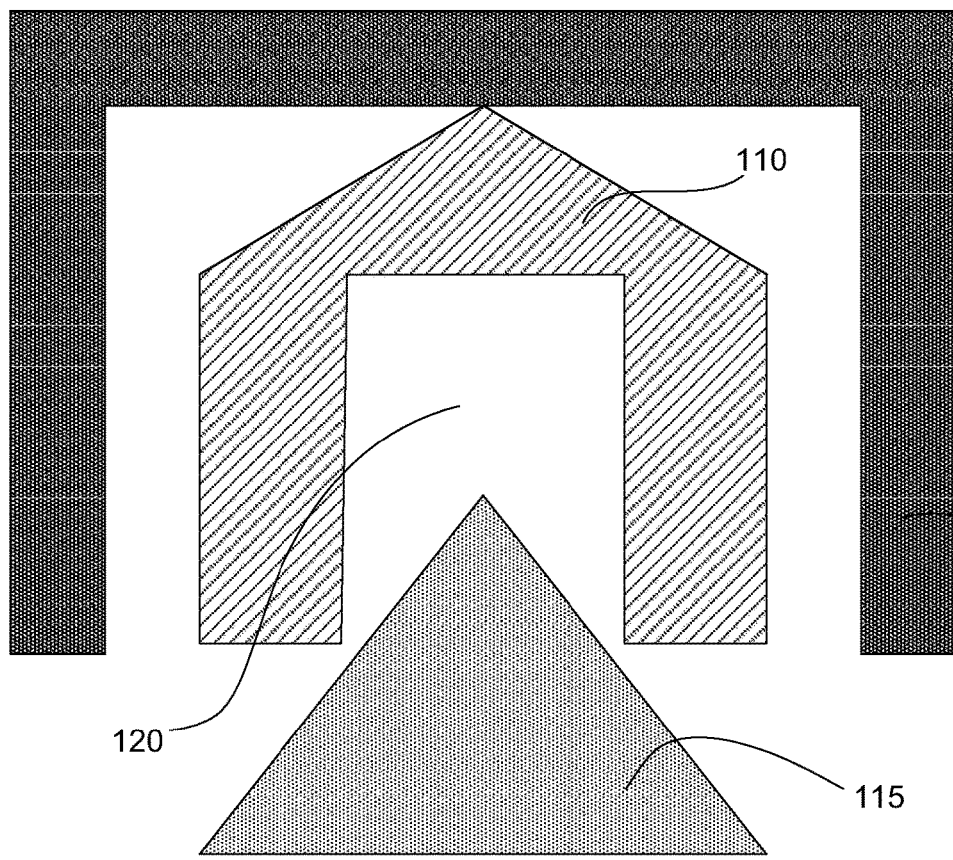
FIGS. 5A-B provide schematic views illustrating operation of a device for securing a load, in accordance with some embodiments of the present disclosure.
Figure 5B:
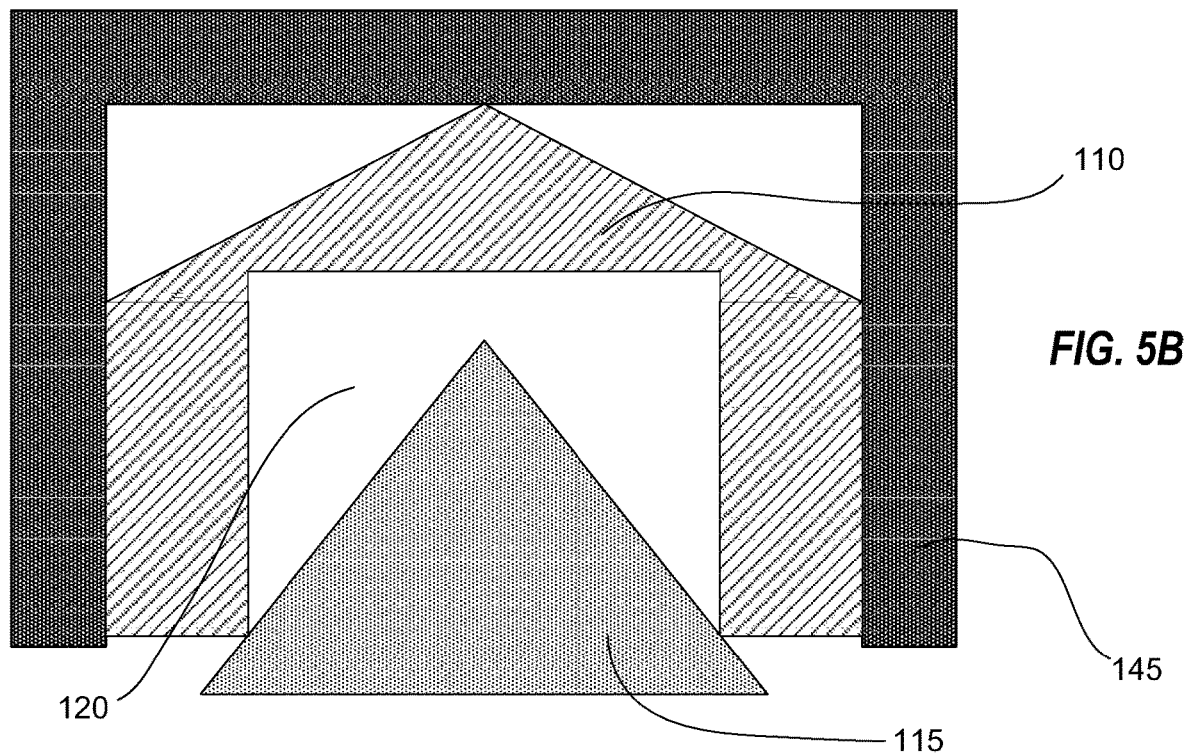

FIGS. 5A-B illustrate operation of an exemplary device of the present disclosure. FIG. 5A illustrates the device in which the snubber 110 is in a contracted position and is inserted into the chamber 140. The snubber 110 can be inserted, in part, due to the gap between the outer surface of the snubber 110 and the inner surface of the chamber 145. Once the snubber 110 is inserted into the slot 120, the wedge 115 can be driven into the slot 120, causing the snubber 110 to expand against the inner walls of the chamber 145. This can cause an interference fit between the snubber 110 and the chamber 145 to secure the load (not shown) in position.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A device comprising:
    a sled configured to be coupled to a load;
    a snubber comprising a snubber slot and coupled to the sled, the snubber configured to:
        be inserted into a chamber; and
        move between a contracted position and one or more expanded positions; and
    a wedge comprising:
        a distal end configured to be inserted into the snubber slot in a distal direction; and
        a proximal end comprising a first plurality of teeth;
    wherein:
        insertion of the wedge causes the snubber to transition from the contracted position to one or more of the expanded positions; and
        the snubber forms an interference fit with an internal wall of the chamber when in a first expanded position of the one or more expanded positions to fix a location of the load relative to the chamber.

2. The device of claim 1 further comprising:
    a pawl comprising a second plurality of teeth configured to engage the first plurality of teeth to prevent movement of the wedge in a proximal direction.

3. The device of claim 2, wherein the pawl further comprises:
    a first pawl arm comprising the second plurality of teeth; and
    an opposing second pawl arm comprising a third plurality of teeth;
    wherein the third plurality of teeth are configured to engage a fourth plurality of teeth positioned on the distal end of the wedge.

4. The device of claim 2 further comprising:
    a cam configured to cause the second plurality of teeth to disengage from the first plurality of teeth, thereby allowing movement of the wedge in the proximal direction.

5. The device of claim 1 further comprising:
    a bolt configured to be inserted into the wedge;
    wherein:
        the proximal end of the wedge further comprises an aperture into which the bolt is configured to be inserted; and
        actuation of the bolt causes the wedge to move in the distal direction.

6. The device of claim 1, wherein the snubber further comprises:
    a first snubber arm; and
    a second snubber arm;
    wherein the snubber slot is positioned between the first and second snubber arms.

7. The device of claim 6, wherein a distance between the first snubber arm and the second snubber arm is greater when the snubber is in one or more of the expanded positions than in the contracted position.

8. The device of claim 6, wherein the snubber further comprises:
    a hinge configured to couple the first snubber arm to a distal end of the snubber;
    wherein the hinge is configured to allow the snubber to transition from the contracted position to one or more of the expanded positions.

9. The device of claim 1, wherein the snubber comprises plastic.

10. The device of claim 1, wherein the snubber comprises a single integrated piece of plastic.

11. A device comprising:
    a snubber having a distal end configured to be inserted into a chamber and a proximal end comprising a slot;
    a wedge having a distal end and a proximal end comprising a first plurality of teeth; and
    a pawl comprising a second plurality of teeth;
    wherein:
        the snubber is configured to transition between:

a contracted state allowing movement within the chamber; and an expanded state in which the snubber forms an interference fit within the chamber;

the distal end of the wedge is configured to be inserted into the slot of the snubber to cause the snubber to transition from the contracted state to the expanded state;

cooperative engagement of the first and second pluralities of teeth prevents the wedge from moving in a proximal direction; and the device is configured to:
attach to a load; and
secure the load when the snubber is in the expanded state in the chamber.

12. The device of claim 11 further comprising:
a sled configured to removably attach to the load;
wherein the snubber and wedge are coupled to the sled.

13. The device of claim 11 further comprising:
a cam configured to cause the pawl to move away from the wedge disengaging the first plurality of teeth from the second plurality of teeth.

14. The device of claim 11 further comprising:
a bolt configured to be inserted into the wedge;
wherein:
the proximal end of the wedge further comprises an aperture into which the bolt is configured to be inserted; and
actuation of the bolt causes the wedge to move in a distal direction.

15. The device of claim 11, wherein the snubber further comprises;
a first snubber arm; and
a second snubber arm;
wherein the slot of the snubber is positioned between the first and second snubber arms.

16. The device of claim 15, wherein a distance between the first snubber arm and the second snubber arm is greater when the snubber is in the expanded state than in the contracted state.

17. The device of claim 15, wherein the snubber further comprises;
a hinge configured to couple the first snubber arm to the distal end of the snubber;
wherein the hinge is configured to allow the snubber to transition from the contracted state to the one or more expanded state.

18. The device of claim 11, wherein the snubber comprises a single integrated piece of plastic.

19. A device comprising:
a sled configured to be coupled to a load;
a snubber having a distal end configured to be inserted into a chamber and a proximal end comprising a slot;
a wedge having a distal end and a proximal end comprising a first plurality of teeth and an aperture; and
a pawl comprising a second plurality of teeth;
wherein:
the snubber is configured to be coupled to the sled and transition between a contracted position allowing movement within the chamber and one or more expanded positions in which the snubber forms an interference fit within the chamber to fix and secure a location of the load relative to the chamber;
the wedge is configured to be inserted into the slot of the snubber in a distal direction, which causes the snubber to transition from the contracted position to one or more of the expanded positions; and
cooperative engagement of the first and second pluralities of teeth prevents the wedge from moving in a proximal direction.

20. The device of claim 19 further comprising:
a cam; and
a bolt;
wherein:
the snubber further comprises a hinge, a first snubber arm, and a second snubber arm, wherein the hinge is configured to couple the first snubber arm to the distal end of the snubber and to allow the snubber to transition from the contracted position to one or more of the expanded positions, and wherein the slot of the snubber is positioned between the first and second snubber arms;
the pawl further comprises a first pawl arm comprising the second plurality of teeth and an opposing second pawl arm comprising a third plurality of teeth, and wherein the third plurality of teeth are configured to engage a fourth plurality of teeth positioned on the distal end of the wedge;
the cam is configured to cause the second plurality of teeth to disengage from the first plurality of teeth, thereby allowing movement of the wedge in the proximal direction; and
the bolt is configured to be inserted into the aperture of the wedge, and wherein actuation of the bolt causes the wedge to move in the distal direction.

* * * * *